(12) United States Patent
Cavendish

(10) Patent No.: US 7,058,063 B1
(45) Date of Patent: Jun. 6, 2006

(54) PIPELINED PACKET SCHEDULER FOR HIGH SPEED OPTICAL SWITCHES

(75) Inventor: Diceru Galvao Cavendish, Monmouth Junction, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/460,649

(22) Filed: Dec. 14, 1999

Related U.S. Application Data

(63) Continuation-in-part of application No. 09/335,908, filed on Jun. 18, 1999.

(51) Int. Cl.
*H04L 12/56* (2006.01)

(52) U.S. Cl. .................... 370/395.41; 370/498

(58) Field of Classification Search ........ 370/229–232, 370/235, 357, 360, 363–365, 369–373, 375–376, 370/412–419, 422, 428, 429
See application file for complete search history.

(56) References Cited

U.S. PATENT DOCUMENTS

| | | | | |
|---|---|---|---|---|
| 5,241,536 | A | * | 8/1993 | Grimble et al. ............. 370/398 |
| 5,255,265 | A | * | 10/1993 | Eng et al. .................... 370/416 |
| 5,299,190 | A | * | 3/1994 | LaMaire et al. ............ 370/413 |
| 5,301,055 | A | * | 4/1994 | Bagchi et al. ............... 359/139 |
| 5,577,035 | A | * | 11/1996 | Hayter et al. ............ 370/395.4 |
| 5,982,776 | A | * | 11/1999 | Manning et al. ............ 370/414 |
| 6,359,861 | B1 | * | 3/2002 | Sui et al. ..................... 370/230 |
| 6,477,169 | B1 | * | 11/2002 | Angle et al. ............ 370/395.42 |
| 6,618,379 | B1 | * | 9/2003 | Ramamurthy et al. . 370/395.41 |

FOREIGN PATENT DOCUMENTS

| | | |
|---|---|---|
| JP | 2-87745 | 3/1990 |
| JP | 2-237337 | 9/1990 |
| JP | 4-58644 | 2/1992 |
| JP | 4-271546 | 9/1992 |
| JP | 8-223213 | 8/1996 |
| JP | 2000-78148 | 3/2000 |
| JP | 2000-183884 | 6/2000 |

OTHER PUBLICATIONS

Chipalkatti et al., "Protocols for Optical Star-Coupler Network Using WDM," *IEEE Journal on Selected Areas in Communications*, vol. 11, No. 4, May 1993.

(Continued)

*Primary Examiner*—Chi Pham
*Assistant Examiner*—Thai Hoang
(74) *Attorney, Agent, or Firm*—Sughrue Mion, PLLC

(57) ABSTRACT

A pipelined scheduler which allows easy implementation and control and further fair scheduling among input lines of a crossbar high speed switch fabric is discussed. By means of a round-robin communication scheme, a systematically ordered sequence of visits to time slots can be obtained regardless of whether the number of scheduler modules is even or odd by framing the time axis and using a priority matrix to reserve future time slots. Further, a Carry Over Round-robin Pipelined Scheduler (CORPS) achieves scalability to a large number of ports. Moreover, CORPS achieves one scheduling decision per line per slot, by scheduling packets in future slots. It is well suited to the support of Quality of Service traffic, since the choice of the queues to be scheduled is arbitrary. CORPS limits itself to resolve, in a fair way, the contention for output ports.

14 Claims, 14 Drawing Sheets

OTHER PUBLICATIONS

T. Anderson, S. Owicki, J. Saxe, C. Thacker, "High Speed Switch Scheduling for Local Area Networks," *ACM Transactions on Computer Systems*, pp. 319-352, Nov. 1993.

Cormen, Leiserson and Rivest, "Introduction to Algorithms", McGraw-Hill, 1990.

L. Georgiadis, R. Guerin, V. Peris, "Efficient Network QoS Provisioning Based on per Node Traffic Shaping," *Proceedings of INFOCOM96*, vol. 1, pp. 102-110, 19996.

J.E. Hopcroft, R.M. Karp, "An $n^{5/2}$ Algorithm for Maximum Matching in Bipartite Graphs", *Society for Industrial and Applied Mathematics J. Comput.*, 2 (1973), pp. 225-231.

M.J. Karol, M.G. Hluchyj, S.P. Morgan, "Input Versus Output Queueing on a Space Division Packet Switch", *IEEE Transactions on Communications*, vol. COM-35, No. 12, pp. 1347-156, Dec. 1987.

A. Mekkittikul, N. McKeown, "A Practical Scheduling Algorithm to Achieve 100% ΛThrough-put in Input-Queued Switches", *Proceedings of Infocom98*, Apr. 1998.

N. Mckeown, M. Izzard, A. Mekkittikul, W. Ellersick, M. Horowitz, "The Tiny Tera: A Packet Switch Core", *IEEE Micro*, Jan./Feb. 1997, pp. 26-32.

N. McKeown, V. Anantharam, J. Walrand, "Achieving 100% ΛThroughput in an Input-Queued Switch", *Proceedings of Infocom96*, San Francisco, Mar. 1996.

N. McKeown, "Scheduling Cells in an Input-Queued Switch", *PhD Thesis*, University of California, at Berkeley, 1995.

A. Smiljanic, R. Fan, G. Ramamurth, "RRGS-Round-Robin Greedy Scheduling for Electronic/Optical Terabit Switches", *NEC C&C Research Labratories*, Technical Report TR 98-C063-4-5083-2, 1998.

Y. Tamir and H-C Chi, "Symmetric Crossbar Arbiters for VLSI Communication Switches", *IEEE Transactions on Parallel and Distributed Systems*, vol. 4, No. 1, pp. 13-27, 1993.

Y. Tamir and G. Frazier, "High Performance Multi-queue Buffers for VLSI Communication Switches", *Proceedings of 15th Ann. Symp. on Comp. Arch.*, pp. 343-354, Jun. 1988.

R.E. Tarjan, "Data Structures and Network Algorithms", *Society for Industrial and Applied Mathematics*, Pennsylvania, Nov. 1983.

J. Turner, "New Directions in Communications, or Which Way to the Information Age?", *IEEE Communication Magazine*, vol. 24, pp. 8-15, 1986.

H. Zhang, "Service Disciplines for Guaranteed Performance Service in Packet-Switching Networks", *In Proceedings of IEEE*, vol. 83, No. 10, pp. 1374-1396, Oct. 1995.

Pao, D. C. W.: "Scheduling Input-Buffered Multicast ATM Switch"; ATM Workshop Proceedings, 1998 IEEE, Fairfax, VA, USA; May 26-29, 1998; New York, NY, USA, IEEE, US, May 26, 1998; pp. 51-55.

Akata, M., et al.: "An Input Buffering ATM Switch Using a Time-Slot Scheduling Engine"; NEC Research and Development, Nippon Electric Ltd., Tokyo, JP; vol. 33, No. 1, Jan. 1992; pp. 64-71.

Mekkittikul, A., et al.: "A Practical Scheduling Algorithm to Achieve 100% Throughput in Input-Queued Switches"; Infocom '98; Seventeenth Annual Joint Conference of the IEEE Computer and Communications Societies Proceedings, IEEE San Francisco, CA, USA, Mar. 29-Apr. 2, 1998; New York, NY, USA, IEEE, US; vol. 2, Mar. 29, 1998; pp. 792-799.

Smiljanic, A., et al.: "RRGS-Round-Robin Greedy Scheduling for Electronic/Optical Terabit Switches"; 1999 IEEE Global Telecommunications Conference—Globecom '99; Seamless Interconnection for Universal Services, Rio De Janeiro, Brazil, Dec. 5-9, 1999; IEEE Global Telecommunications Conference, New York, NY : IEEE, US; vol. 2, Dec. 5, 1999; pp. 1244-1250.

\* cited by examiner (G)RANT/(A)RBITER
ARCHITECTURE

SINGLE BLOCK PER
CROSS POINT ARCHITECTURE

PIPELINED PACKET SCHEDULER FOR HIGH SPEED OPTICAL SWITCHES

CROSS REFERENCE TO RELATED APPLICATION

This application is a continuation-in-part of pending application Ser. No. 09/335,908, filed Jun. 18, 1999.

BACKGROUND OF THE INVENTION

1. Field of the Invention

The present invention relates to network systems and switches that control the flow of data around the network, and more particularly to schedulers that manage the flow of data through high capacity switches.

2. Description of the Related Art

Input queue switch architecture has always been an attractive alternative for high speed switching systems, mainly because the memory access speed of input buffers scale with the speed of a single input line, not with the total switching capacity. However, an input buffered switch has long been known to suffer from head-of-line blocking, which puts a theoretical limit of 58.6% in its total throughput. See, M. J. Karol, M. G. Hluchyj, S. P. Morgan, "Input Versus Output Queuing on a Space-Division Packet Switch", *IEEE Transactions on Communications*, Vol. COM-35, No. 12, pp. 1347–1356, December 1987.

More recently, an input queuing technique, called Virtual Output Queuing (VOQ), has been proposed to overcome the head-of-line blocking problem of input switches. See, Y. Tamir and G. Frazier, "High Performance Multi-queue Buffers for VLSI Communication Switches", *Proceedings of 15th Ann. Symp. on Comp. Arch.*, pp. 343–354, June 1988 and T. Anderson, S. Owicki, J. Saxe, C. Thacker, "High Speed Switch Scheduling for Local Area Networks," *ACM Transactions on Computer Systems*, pp. 319–352, November 1993. The idea is to keep separate queues for each output port of a switch, so that the possibility of having a packet destined to an available output port blocked from being served by a head-of line packet which can not proceed due to contention for a different port is eliminated. Thus, a N×N switch has N queues per input port, or $N^2$ queues. As discussed by others, A. Mekkittikul, N. McKeown, "A Practical Scheduling Algorithm to Achieve 100% Thoughput in Input-Queued Switches", *Proceedings of Infocom98*, April 1998, further exploration of the VOQ technique has shown that indeed 100% throughput is achievable, through the design of smart schedulers.

Schedulers for VOQ input buffered switches, then, become one of the key design points of a high speed input buffered switch. With VOQ, a scheduler has multiple choices for switching packets from backlogged input ports to output ports, much more than in a regular First-In-First-Out (FIFO) input queuing architecture. Every input/output pair of ports can be selected, among the backlogged input ports. Most work devoted to such schedulers can be classified as follows. Centralized schedulers are those for which the scheduler is a single entity, which has information about all $N^2$ VOQs, and makes a scheduling decision about all possible input/output pairs of ports per packet slot. See, for example, A. Mekkittikul, N. McKeown, "A Practical Scheduling Algorithm to Achieve 100% Thoughput in Input-Queued Switches", *Proceedings of Infocom98*, April 1998. Distributed schedulers, on the other hand, are those for which the scheduler is partitioned in functional blocks, usually one or two blocks per input or output port or even one block per input/output cross point. See, for example, N. McKeown, M. Izzard, A. Mekkittikul, W. Ellersick, M. Horowitz, "The Tiny Tera: A Packet Switch Core", *IEEE Micro*, January/February 1997, pp. 26–32 and Y. Tamir and H-C Chi, "Symmetric Crossbar Arbiters for VLSI Communication Switches", *IEEE Transactions on Parallel and Distributed Systems*, Vol. 4, No. 1, pp. 13–27, 1993.

Centralized schedulers require the access to $N^2$ pieces of information before scheduling decisions can be made. Such schedulers are generally not scalable, in the sense that the hardware to implement such schedulers is highly dependent on the number of switch lines N. FIG. 1 illustrates one such scheduler. Distributed schedulers have the potential to make the hardware more independent of the number of switch ports. However, the ones proposed so far still require a communication mechanism which provides information about all $N^2$ queues before a scheduling decision can be made for a particular packet slot. This communication can take place either in a parallel way (as in the SLIP scheduler, see, N. McKeown, M. Izzard, A. Mekkittikul, W. Ellersick, M. Horowitz, "The Tiny Tera: A Packet Switch Core", *IEEE Micro*, January/February 1997, pp. 26–32), or in a round-robin way (See Y. Tamir and H-C Chi, "Symmetric Crossbar Arbiters for VLSI Communication Switches", *IEEE Transactions on Parallel and Distributed Systems*, Vol. 4, No. 1, pp. 13–27, 1993). Both architectures are shown in FIG. 2. The parallel communication architecture requires an explicit dependence of each block with the size of the switch, since each block must receive $N^2$ messages. The round-robin architecture overcomes this problem, but creates another one: in order to achieve a scheduling decision about all output ports, the message passing must complete a full round within a single packet slot. This requires message processing of at least N times faster than the scheduling decisions.

More recently, a Round-Robin Greedy Scheduler (RRGS) was proposed, a scheduler based on message passing, in which each input port makes a scheduling decision, and passes this information, in a round-robin fashion, to a next neighbor. See, A. Smiljanic, R. Fan, G. Ramamurthy, "RRGS-Round-Robin Greedy Scheduling for Electronic/ Optical Terabit Switches", *NEC C & C Research Laboratories*, Technical Report TR 98-C063-4-5083-2, 1998. See, also, co-pending U.S. application Ser. No. 09/206,975. In order to reduce message passing speed requirements, RRGS introduces a pipeline feature. Input ports make scheduling decisions about future slots, far enough into the future, so as to allow enough time for the message passing mechanism to disseminate this information among the other input ports. RRGS can provide high speed scheduling.

Before engaging in the description of the present invention, the general pipelined scheduler architecture will be discussed. For a switch architecture, it is assumed that the scheduling is applied to a pure non-blocking N×N crossbar switch. It is also assumed that Virtual Output Queues (VOQs) are used to take care of the HOL blocking problem. FIG. 3 shows one such switch.

In addition, fixed size packets and uniform link speeds are assumed. Time is slotted, where a slot is defined to be the time taken for the transmission of a single packet by an output link. A non-blocking crossbar can thus switch up to N packets per time slot, if no output port contention exists. The basic task of the scheduler is to determine which VOQ queues, among the $N^2$ which are non-empty, will have access to the output ports, on a per slot basis. For efficiency, the scheduler must resolve all contentions among the backlogged queues within a single time slot.

As line speeds continue to grow, it is paramount that scheduling algorithms be scalable to large capacity switches. Therefore, a distributed architecture seems attractive, since it alleviates the tight processing time required for packet scheduling in a high speed switch. For instance, for a 10 Gbit/s line speed, 16×16 port switch, scheduling decisions must be done at each packet transmission time, 42 ns for a 424 bit ATM cell. If a sequential scheduler is used, each decision must be made in less than 0.16 ns for a 16×16 switch, since $N^2$ decisions must be made. If an optical core is used, it makes sense to distribute the electronic hardware on a per port basis, leaving the total switching bandwidth requirement for the optical core. Moreover, a distributed scheduler should naturally scale to any number of lines. FIG. 4 illustrates such a scheduler.

Each crossbar input port has an Input Port Scheduler Module (SM). Each SM has a distinct ID, SM-ID. In order to maintain scalability with the number of lines, a SM is allowed to communicate with a single immediate neighbor only. This ensures that the SM hardware block can be used with any N×N crossbar fabric. The SM communication chain is shown in FIG. 4. It is used to communicate scheduling information, such as time slot, slot ownership, and output port reserved. The only interaction between the crossbar module and the SMs is via a global clock, which tells every SM what slot is the Current system Time Slot—CTS—as well as the current decision table, with pairs of input/output ports to be switched at CTS (not shown in the figure). This can be implemented by a global memory, to be written by the schedulers, and to be read by the crossbar fabric.

For every time slot, each SM is supposed to have complete freedom of choice to which output port it requests access to. SMs with similar choices generate what is hereafter called a collision, which needs to be resolved before a global scheduling pattern can be determined for a given slot. If a SM is to have current information about all other requests, the communication chain must operate at a speed N times faster than the speed of scheduling decisions. Namely, SMs would need to be able to receive N messages, before making a single scheduling decision. In order to keep the speed of the SM hardware scalable with the line speed, a N look ahead scheduling scheme may be employed. Namely, each SM will make a scheduling decision about a time slot that is at least N slots ahead of the current slot. This feature ensures that a SM knows about others' scheduling decisions already made for the same slot, before making its own scheduling decision. Moreover, this feature comes without the need for speeding up the communication chain to N times the input line speed. As described above, RRGS has the features of distributed scheduling, pipeline scheduling, and N look ahead scheduling.

FIG. 5 is a time chart showing an example of RRGS scheduling employed in the 4×4 crossbar switch, more specifically showing a relationship between four SMs (SM1–SM4) and future time slots T6, T7, . . . , at which each of SM1–SM4 reserves an output port for its own input.

For example, at a time slot T5 of FIG. 5, SM1 performs the scheduling of future time slot T10, that is, chooses an output port for transmission at future time slot T10, and SM3 performs the scheduling of future time slot T9. At the time slot T6 following T5, SM1 performs the scheduling of future time slot T8, and so on.

In this way, each SM performs the scheduling and then transfers the resultant schedule to the next SM, ensuring that each SM timely receives from the previous SM scheduling information about output ports which have been already scheduled. Therefore, if a SM avoids choosing output ports which have been already picked by previous "visitors", then collisions can be completely avoided.

According to RRGS, however, the sequence of time slots for a SM to pick output ports becomes complicated.

In FIG. 6, more specifically, the respective sequences of time slots for SM1–SM4 are shown, which are obtained by converting the time chart of FIG. 5 into a form suitable for a sequence of visits to time slots for each SM. For SM1, for instance, the sequence of time slots is T10, T8, T11, T9, . . . , which are not systematically arranged in time sequence or reverse time sequence. This causes the implementation and control of RRGS to become complicated.

Further, RRGS performs different scheduling operations depending on whether the number of SMs is even or odd (see, A. Smiljanic, R. Fan, G. Ramamurthy, "RRGS-Round-Robin Greedy Scheduling for Electronic/Qptical Terabit Switches", *NEC C & C Research Laboratories*, Technical Report TR 98-C063-4-5083-2, 1998). Therefore, each time a SM is added, the control must be changed, resulting in complicated implementation and control.

Furthermore, SMs are restricted to picking output ports which have not yet been chosen. Therefore, VOQ service rates would become difficult to predict and further a serious fairness problem arises. Assuming in FIG. 4 that SMs #1 and #2 have their queues for a given output port constantly backlogged, while the other SMs have their corresponding queues empty. In this case, three out of four slots will be picked by SM #1 in FIG. 5, since it visits three out of the four slots prior to SM #2, in the sequence of visits as defined in FIG. 5 (see, A. Smiljanic, R. Fan, G. Ramamurthy, "RRGS-Round-Robin Greedy Scheduling for Electronic/Qptical Terabit Switches", *NEC C & C Research Laboratories*, Technical Report TR 98-C063-4-5083-2, 1998).

As described above, although the previously described RRGS scheduler can advantageously achieve high-speed scheduling, it has disadvantages that the implementation and control of RRGS becomes complicated and further predicable and adjustable service rates cannot be realized. As discussed above, there is also a problem of fairness, which prevents some of the VOQs from being scheduled because of the states of the other VOQs.

SUMMARY OF THE INVENTION

An object of the present invention is to provide a fundamental architecture for a scheduler which allows simplified implementation and control of RRGS.

Another object of the present invention is to provide a scheduler for a high capacity switch that allows complete freedom of choice to which VOQ queue to attempt scheduling.

Still another object of the invention is to provide a scheduler that makes VOQ service rates both more predictable and adjustable.

Further still another object of the invention is to provide a scheduler that is also a fair scheduler, in the sense that any VOQ has the same chance of being scheduled, regardless of the state other VOQs.

One extra constraint in the scheduler design is that the decision of which among the N VOQs belonging to a given input line to be scheduled next be out of the scheduler control. In other words, an external entity has total freedom to decide which output port should be attempted to be scheduled next, on a per input port basis. This requirement is paramount to the future support of Quality of Service (QoS). It is clear that this may reduce the maximum throughput in favor of a more predictable service rate of VOQs. This is an important point, however, since the maximization of the overall switch throughput may lead to starvation of some of the queues, and consequently the flows associated with them.

According to the first aspect of this invention, a switch is provided for controlling the flow of data in a network, having input ports, output ports, and a scheduler having a plurality of input port schedule modules. Each schedule module schedules a particular input port of said input ports for sending data to a designated output port of said output ports. The schedule modules pass a scheduling message from module to module and each schedule module computes a future time slot for which that schedule module will attempt to access the designated output port. The module determines if said future time slot is valid based on whether the future time slot is currently reserved by the current schedule module, whether the future time slot is blocked or whether the future time slot is taken by another schedule module. The schedule module takes the future time slot if valid and enters information into the scheduling message indicating that the future time slot is taken.

In another embodiment, the scheduler of the switch advances the future time slot by a predetermined number of time slots when the future time slot has been reserved or taken.

In another embodiment, the switch queues data input through said input ports using virtual output queuing that maintains separate queues for each of said output ports. Alternatively, the virtual output queuing for a particular port may be independent of the virtual output queuing for the other ports. Additionally, the switch also has service rates of the virtual output queuing that are both predictable and adjustable.

In another embodiment, the switch scheduler selects the designated output port based on a weighted round robin.

According to another aspect of this invention, a method is provided for scheduling input packets arriving at input ports of a switch to be sent to output ports of the switch, where the scheduler has a plurality of input port schedule modules. The steps of the method include:

a) receiving a scheduling message from a previous schedule module by a current schedule module; b) computing a future time slot for which said current schedule module will attempt to access one of said output ports; c) selecting one of said output ports to schedule for transmission at said future time slot; d) determining whether said future time slot has been previously reserved by said current scheduling module; e) determining whether said future time slot is blocked, when said future time slot not has been previously reserved; f) determining whether said future time slot was previously taken by another schedule module, when said future time slot is not blocked; g) determining whether a carry over operation was previously started from said scheduling message, when said future time slot is taken by another schedule module or has been previously reserved by said current scheduling module; h) setting said future time slot to be blocked and returning to step d), when said carry over operation was previously started; i) advancing said future time slot by a predetermined number of time slots, setting a carry over flag and returning to step d), when said carry over operation was not previously started; j) taking said future time slot and entering information into said scheduling message indicating that said future time slot is taken, when said future time slot has not previously taken by another schedule module; and k) passing said scheduling message to a next schedule module.

In another aspect of the invention, the data input through the input ports is queued using virtual output queuing that maintains separate queues for each of the output ports.

In another aspect of the invention, the virtual output queuing for a particular port is independent of said virtual output queuing for the other ports.

In another aspect of the invention, the service rates of said virtual output queuing are both predictable and adjustable.

In another aspect of the invention, the scheduler selects said designated output port based on a weighted round robin.

According to another aspect of the invention, a switch for controlling a flow of data in a network, includes: a plurality of input ports; a plurality of output ports; and a scheduler having a plurality of input port schedule modules, to schedule a particular input port of said input ports for sending data to a designated output port of said output ports. The schedule modules are connected in a ring and, at each time slot, each of the schedule modules receives reservation information from a previous schedule module, determines whether a future time slot is permitted to be reserved for said schedule module to send data, and sends reservation information including its own reservation for a future time slot to a next scheduler module.

According to another aspect of the present invention, a method for scheduling input signals arriving at input ports of a switch to be sent to output ports of said switch having N input port schedule modules, comprises the steps of: a) setting a sequence of frames, each of the frames consisting of N time slots; and b) scheduling the input signals in a current frame so that the input signals are sent to the output ports in a next frame following the current frame.

The step b) may include the steps of: b.1) receiving a scheduling message from a previous schedule module by a current schedule module; b.2) computing a future time slot for which said current schedule module will attempt to access one of said output ports, wherein said future time slot is included in the next frame; b.3) selecting one of said output ports to schedule for transmission at said future time slot; b.4) determining whether said future time slot has been previously reserved by another scheduling module; b.5) taking said future time slot and entering information into said scheduling message indicating that said future time slot is taken, when said future time slot has not previously taken by another schedule module; and b.6) passing said scheduling message to a next schedule module.

In another aspect of the invention, the step b) comprises the steps of: simultaneously starting scheduling decision processes of the N input port schedule modules at the beginning of each frame; simultaneously performing the scheduling decision processes using a pipelined approach in said frame; and simultaneously completing the scheduling decision processes at the end of said frame.

In another aspect of the invention, in the step b), scheduling decision processes of the N input port schedule modules are simultaneously performed in said current frame, wherein the N input port schedule modules make scheduling decisions for different time slots of said next frame.

In another aspect of the invention, in the step b), the input signals in said current frame are scheduled to be sent to the output ports in said next frame by referring to an N×N matrix which defines an ordered sequence of the N input port schedule modules to visit a given time slot in the future.

Additional objects and advantages of the invention will be set forth in the description that follows, and in part will be obvious from the description, or may be learned through practice of the invention. The objects and advantages of the invention may be realized and obtained by means the instrumentalities and combinations particularly pointed out in the appended claims.

DETAILED DESCRIPTION OF THE PREFERRED EMBODIMENTS

According to a first aspect of the present invention, the time axis, discussed above, is further divided into slot frames, each of which being simply a sequence of N consecutive slots. Thus, time can be regarded as a sequence of frames. In order to establish a criterion to resolve collisions among competing SMs, a priority matrix is used. An N×N priority matrix is a matrix which defines an ordered sequence of SMs to visit a given time slot in the future. The row of the matrix indexes a slot in the current frame, which is the frame containing the current system slot. The column of the matrix indexes the slot in the next frame to be visited. An element of the matrix specifies which SM should "visit" the slot in the next frame dictated by the column index.

Figure 7:
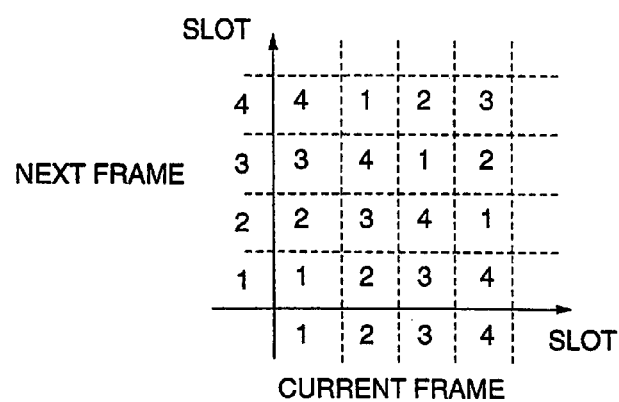
FIG. 7 shows an example priority matrix used to resolve collisions according to a first embodiment of the present invention.
Figure 8:
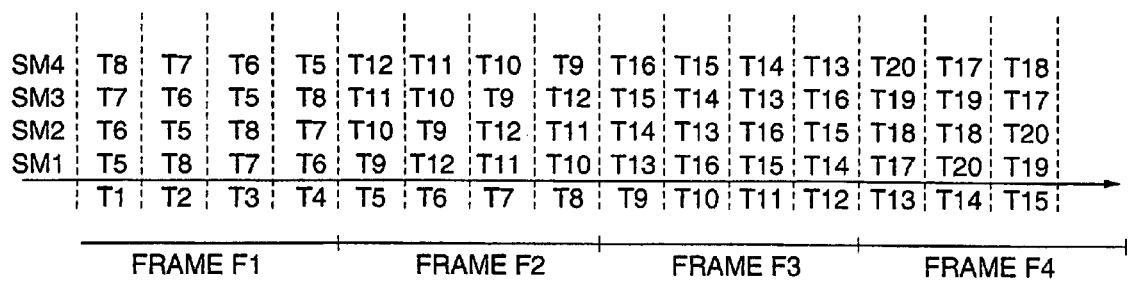
FIG. 8 is a schematic representation of the pipeline scheduling decisions in the case of employing the priority matrix of FIG. 7.

FIG. 7 shows a 4×4 priority matrix and FIG. 8 shows a pipelined sequence of visits to time slots for the priority matrix of FIG. 7. It is noted that a pipelined decision process is already contained in the use of a priority matrix. For instance, when the current time slot of the system is the second slot of the current frame, SM #3 is making a scheduling decision about the second slot of the next frame, while SM #1 is making a scheduling decision about the fourth slot of the next frame.

Figure 1:
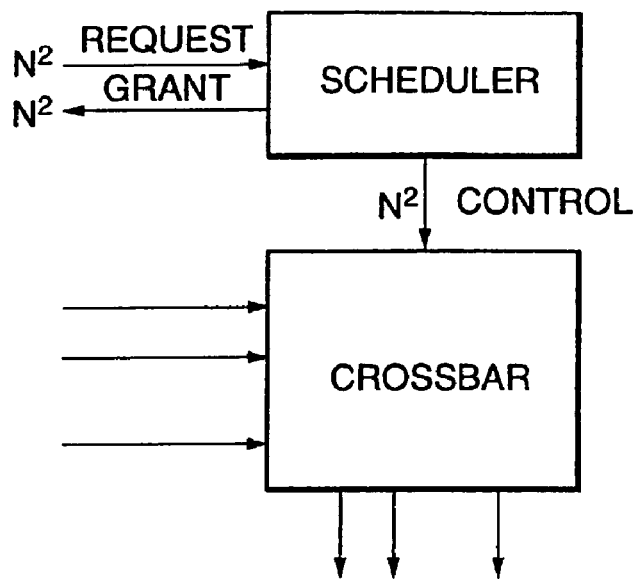
FIG. 1 is a diagram illustrating a centralized VOC scheduler.
Figure 2A:
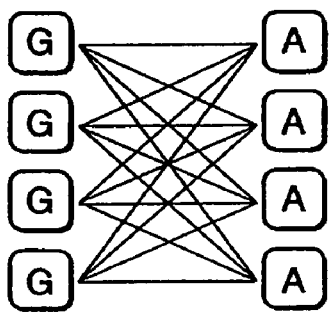
FIGS. 2A and 2B are diagrams illustrating two distributed scheduler architectures.
Figure 2B:
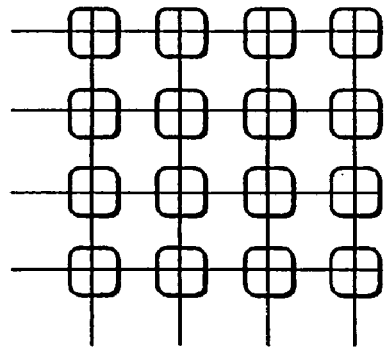
Figure 3:
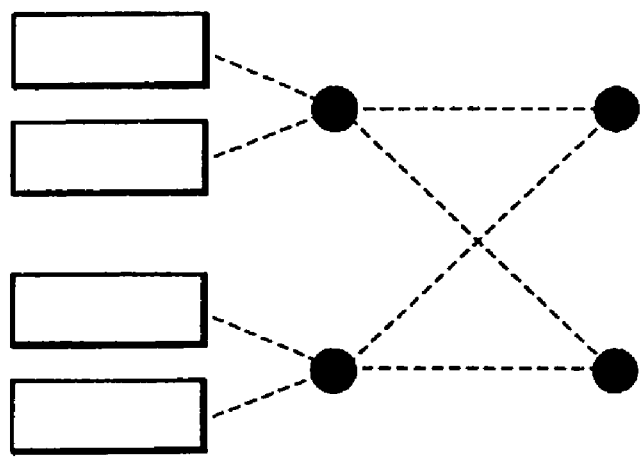
FIG. 3 is a diagram illustrating an input buffered switch architecture.
Figure 4:
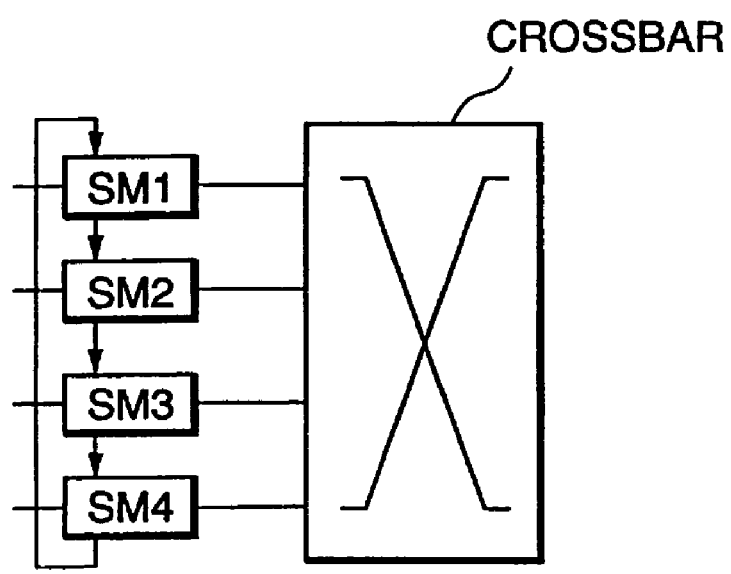
FIG. 4 illustrates the organization of an input port distributed scheduler.
Figures 5, 6:
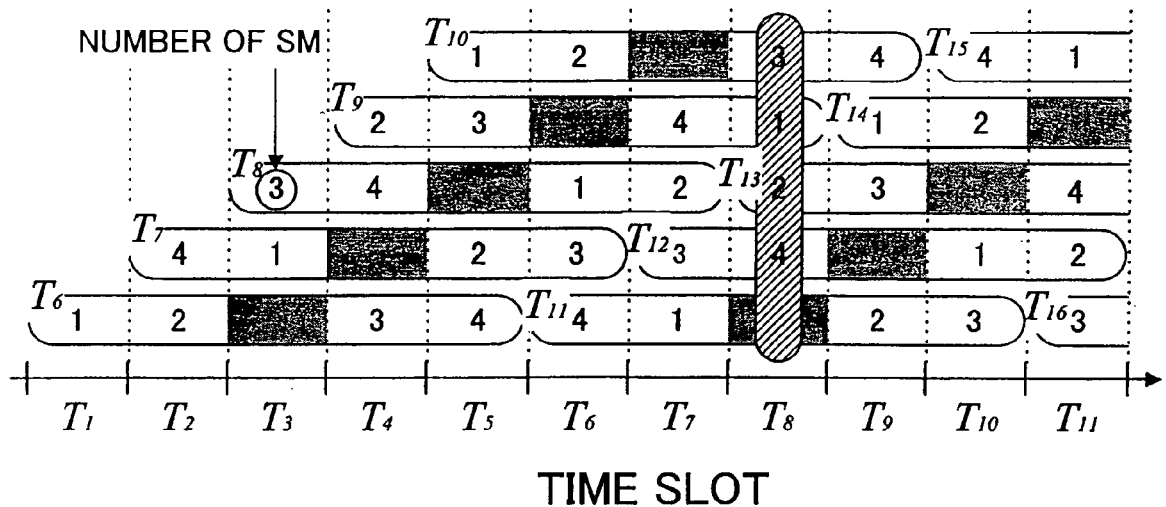
FIG. 5 is a schematic representation of pipeline scheduling decisions according to RRGS.
FIG. 6 is a schematic representation showing the respective sequences of visits to time slots for SM1–SM4, which are obtained by converting the time chart of FIG. 5 into a form suitable for the sequence of time slots for each SM.

The priority matrix allows the time axis to be framed, resulting in a systematically ordered sequence of visits to time slots in each frame. In the frame F1, for example, the respective scheduling decision processes of the SMs are simultaneously started at the beginning of the frame F1, an ordered sequence of time slots for each SM to make scheduling decisions is T8→T7→T6→T5→T8, and the respective scheduling decision processes of the SMs are simultaneously completed at the end of the frame F1. Compared with the sequence of visits to time slots according to RRGS: T10, T8, T11, T9, . . . , as shown in FIG. 6, the sequence according to the present invention is systematically ordered. Therefore, it is easy to implement and control the SMs.

Further, an N×N priority matrix defines a systematically ordered sequence of visits to time slots in the same manner regardless of whether the number of SMs is even or odd.

Figure 9:
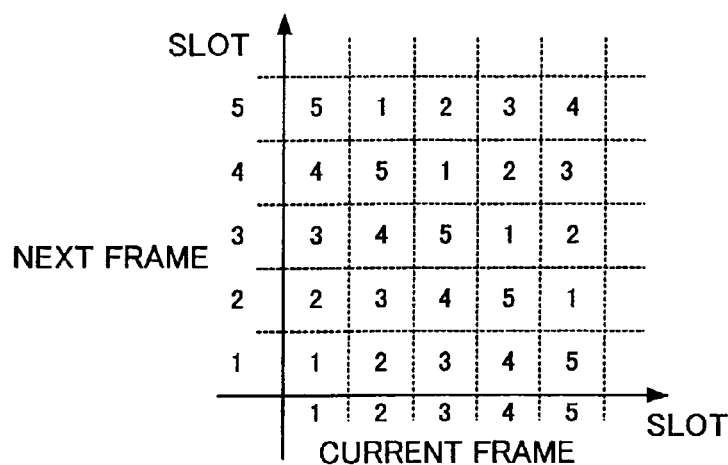
FIG. 9 shows another example priority matrix used to resolve collisions according to the first embodiment.
Figure 10:
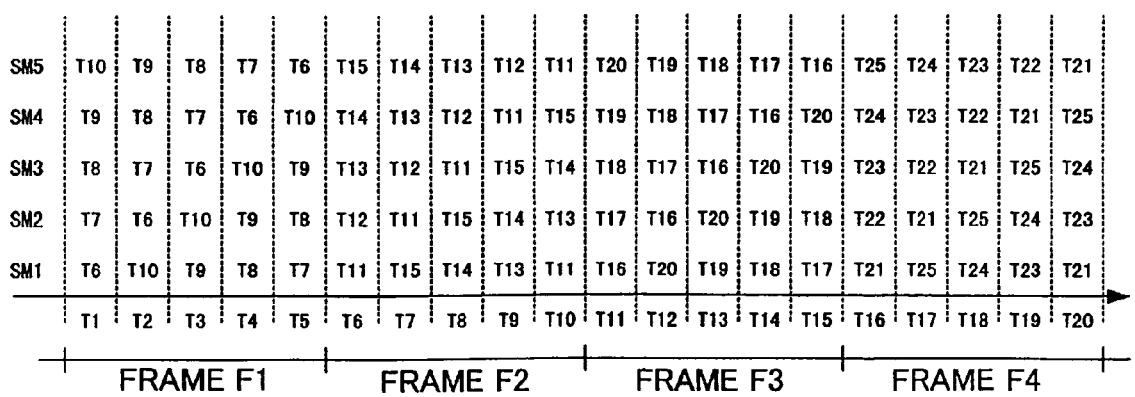
FIG. 10 is a schematic representation of the pipeline scheduling decisions in the case of employing the priority matrix of FIG. 9.

FIG. 9 shows a 5×5 priority matrix and FIG. 10 shows a pipelined sequence of visits to time slots for the priority matrix of FIG. 9. Similarly to the case of N=4, the sequence of visits to time slots is systematically ordered. In the frame F1, for example, the respective scheduling decision processes of the SMs are simultaneously started at the beginning of the frame F1, an ordered sequence of time slots for each SM to make scheduling decisions is T10→T9→T8→T7→T6→T10, and the respective scheduling decision processes of the SMs are simultaneously completed at the end of the frame F1. Since an N×N priority matrix defines a systematically ordered sequence of visits to time slots in the same manner regardless of whether the number of SMs is even or odd, easier implementation and control of SMs can be achieved, compared with the RRGS.

An N×N priority matrix is generated by rotating the sequence of SM neighbors on the same direction of the communication chain message passing. This ensures that every SM has timely information about ports which have already been scheduled. If a SM avoids choosing output ports which have been already picked by previous "visitors", collisions can be completely avoided.

As described above, by framing the time axis and using a priority matrix to reserve future time slots, a systematically ordered sequence of visits to time slots can be obtained regardless of whether the number of SMs is even or odd, resulting in easier implementation and control of SMs.

In a second embodiment, a Carry Over Round-robin Pipelined Scheduler, (CORPS) provides for a fair scheduler for high speed crossbar fabrics and also solves the problems of the prior art scheduler. CORPS has scalability properties regarding both line speeds and number of lines of a high speed switch fabric. For scalability with the number of lines, a distributed architecture, with message passing, has been chosen. Similarly to RRGS, a pipeline architecture is used in order to keep the message processing requirements scalable with line speeds.

Figure 11:
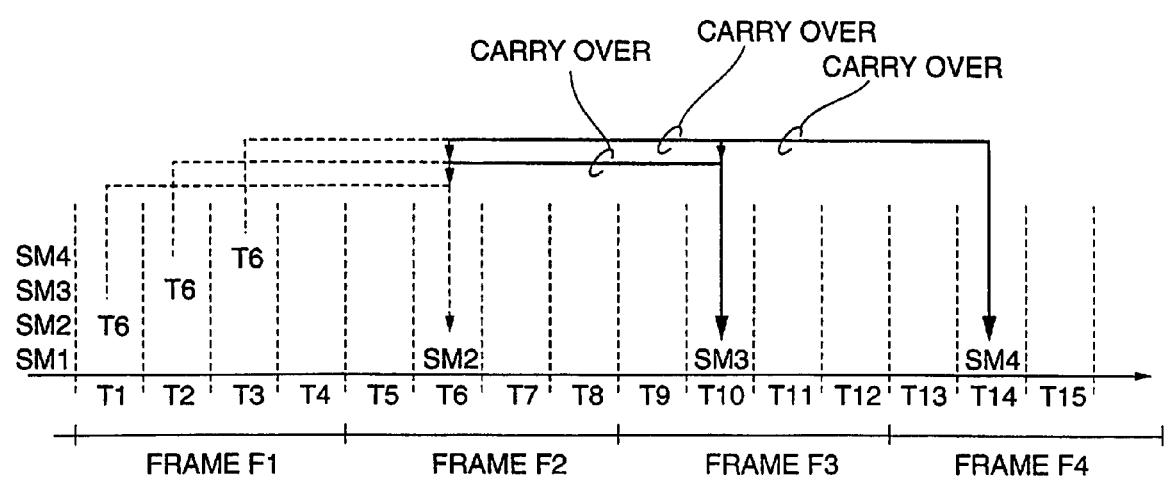
FIG. 11 is a diagram depicting the carry over operation among SMs according to a second embodiment of the present invention.
Figure 12:
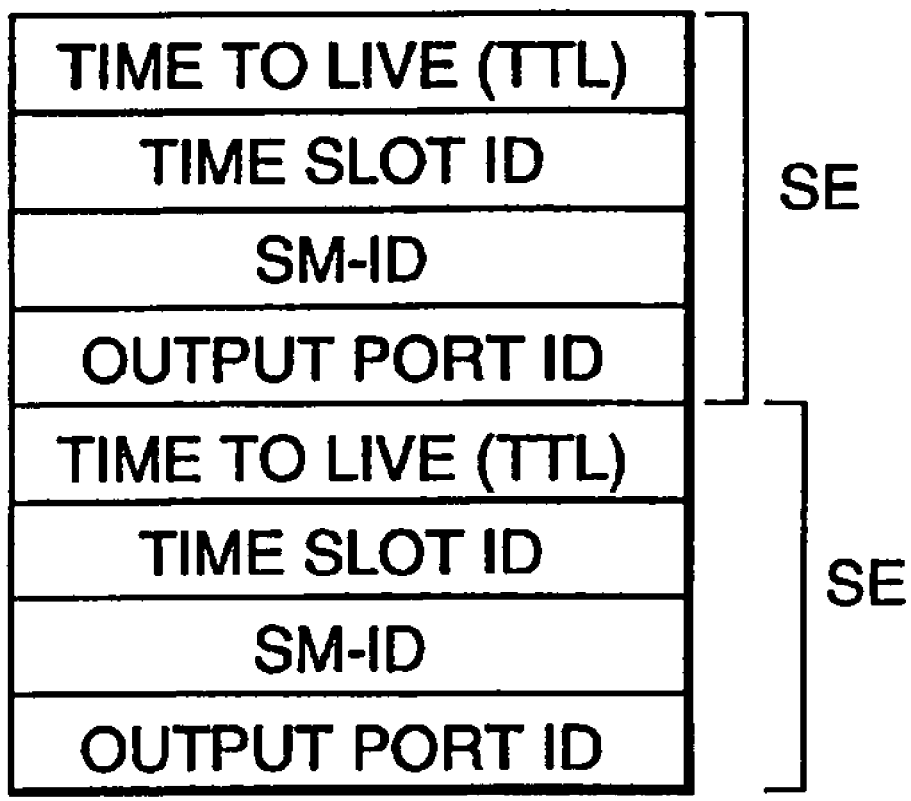
FIG. 12 illustrates a format for the S-message.
Figure 12:
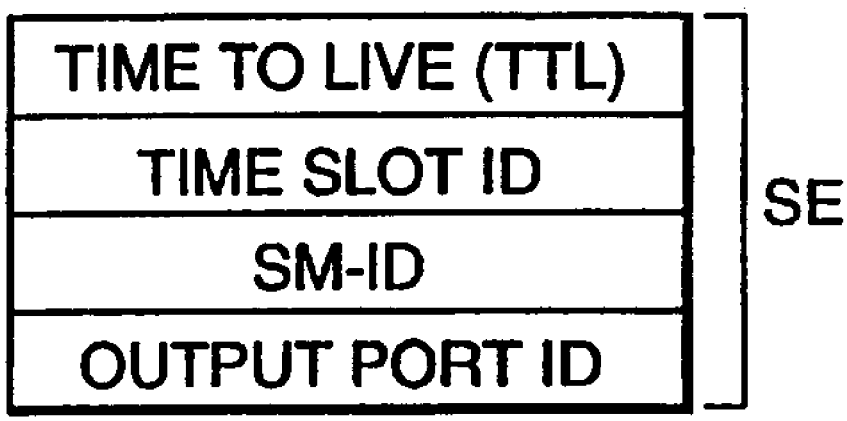
Figure 13:
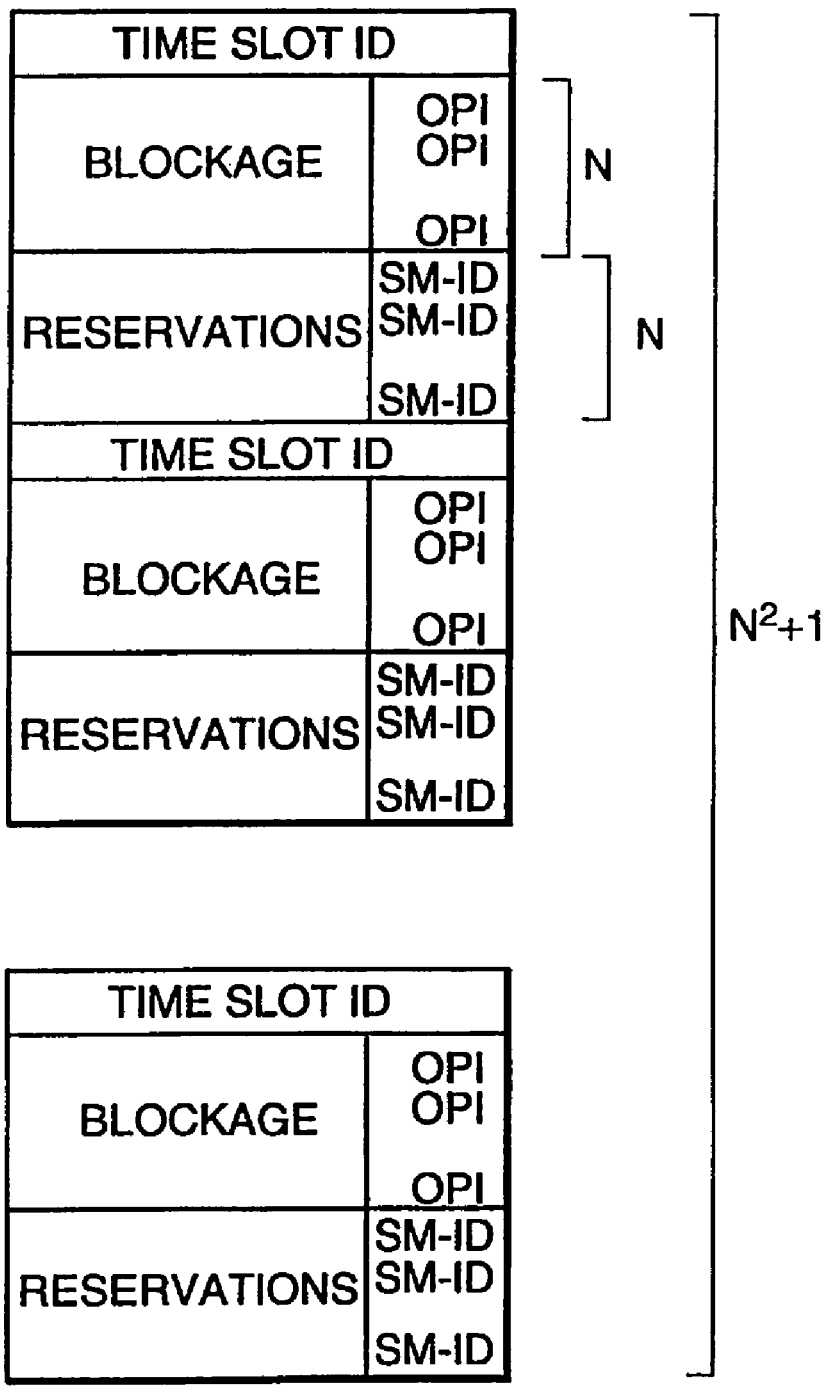
FIG. 13 illustrates a format for the SM data structure.

In order to provide fairness, while maintaining the original distributed architecture and message passing scheme, a carry over operation is introduced. The idea is that, when SM a visits a slot to which the desired output port has been taken by a SM which has preceded a, SM a carries over the scheduling attempt of that port to N slots into the future from the slot just attempted. If the slot is also found to be taken for the same output port, SM goes another N slots further, until it finds a slot to which the desired output port has not yet been taken. FIG. 11 illustrates the carry over operation.

Carry over operations can spread through up to N frames, depending on the number of SMs "colliding" at a given time slot. The slots being affected by a carry over operation can be viewed as a set of slots taken to resolve the collision. Notice that a slot taken on a carry over operation will be visited again in subsequent frames by all SMs. So slots taken by carry over operations can potentially suffer new collisions, causing collision resolution sets to overlap. This could lead to the need of a $N^2$ number of frames for resolving multiple collisions, or $N^3$ slots in total.

In order to reduce the memory requirements of the system, as well as the scheduling delay, the number of frames affected by carry over operations is limited by blocking a given SM, which has performed a carry over operation, from attempting another scheduling for the same output port over the slots taken to resolve that particular collision. In other words, a slot may not be used to resolve more than one collision at the same time. For instance, assume SM a finds a slot m taken by a given port p, which triggers a carry over operation. Let mx be the slot reserved by SM a as the result of this carry over operation. Then, any of the mn slots, $1 \leq n \leq x$ becomes unavailable (blocked) for SM a, for the same port p. Therefore, the blocking feature ensures that multiple collisions over a given slot is forbidden.

The CORPS scheduling algorithm will now be described. The messages passed in the communication chain, as well as the SM database in which scheduling decisions are recorded are described. Subsequently, a flowchart of the algorithm is described.

A vector of scheduling decision elements (SE), to be passed from one SM to the next in the chain at every cell slot, is defined. An S-message contains scheduling elements (SE), with scheduling decisions made in the last N cell slots at most. Thus, an S-message has at most N SEs. S-messages have the following format:

Time To Live—TTL: First set to N by the SM which has generated that SE.

Time Slot ID—TSI: The ID of the slot scheduled, defined as the number of slots from the current TS until the slot to be scheduled.

SM-ID: The ID of the input port Scheduling Module that has placed the scheduling reservation.

Output Port ID—OPI: The ID of the output port scheduled.

At the beginning of a slot, each SM receives a S-message from its upstream neighbor, which contains SEs attached in the last N slots. Every SM makes at most one scheduling decision per time slot. If SM p makes a scheduling decision, it creates a new SE with the following contents: SE–TTL=N; TSI=the number m of slots from the current one up until (and including) the selected time slot; SM–ID=p; and SE–OPI=the desired output port q over which a packet at time slot CTS+m is to be switched from input port p to output port q.

Regardless of any scheduling decision, each SM must decrement the TTL of all other SEs in the S-message, dropping the SEs for which TTL=0 before passing the message to the next SM.

Each SM has a memory array SC of (N+1)N positions. The first N positions record the current frame scheduling decisions, to be read by the crossbar switch module. These positions have identical information about the current frame among all SMs, and they can be accessed by the crossbar controller in several ways. Strictly speaking, SMs do not need to keep this information. The remaining $N^2$ positions are used to record future scheduling decisions. The memory array has the following format: The following fields are defined:

Time Slot ID: The index to the SC array. It gives the time slot ID for which the SC position holds scheduling information. It is synchronized with the global clock provided by the crossbar module. This field wraps around, as the global clock progresses.

Blockage: It defines a set of output ports for which the SM is blocked from attempting a scheduling reservation. There can be up to N entries in this field. It is initially empty.

Reservations: It records scheduling reservations for the given time slot.

CORPS ensures that all entries in this field for the current time slot (CTS) are identical across all SMs. Thus, the crossbar module can read the current input/output scheduling of cells from any SM(CTS). A consistency check of the algorithm can be performed by the crossbar module, by comparing this field among all SMs, if the crossbar controller has enough processing time.

Each SM follows the CORPS scheduling algorithm described in this section. CORPS does not put any constraint on which output port a given SM should attempt to schedule. It is up to each SM to choose which output port it wishes to schedule, following its own policy for serving its VOQs. CORPS scheduling algorithm is depicted as a flowchart in FIG. 14. Each task box in the figure is now addressed.

101. Receive S-message task: Receive S-message from previous SM; For each SE, decrement TTL. For a given SE, IF TTL>0, decrement TSI and update SC at TSI. IF TTL=0, remove the SE from S-message. Reset CARRY=FALSE flag (see task 109).

102. Compute slot to be attempted: Use the appropriate priority matrix to compute which Future Time Slot FTS to attempt scheduling. For convenience, the matrix can be encoded in a function f of the form FTS=f(CTS, SM_ID).

103. Pick output port: Choose which output port (OPIS) the SM wishes to schedule for transmission. Notice that the strategy of choosing the output port could depend on the result of the previous task. CORPS does not specify this strategy (for instance, a weighted round robin choice of output ports could be used).

104. Do I own the slot test: Simply check if among the RESERVATIONS entries of SC(FTS), any SM-ID is equal to the SM executing the scheduling.

105. Am I blocked test: Check if among the BLOCKAGE entries of SC(FTS), any OPI is equal to the output port OPIS for which a scheduling is being attempted.

106. Pass S-message task: Pass S-message to the next SM.

107. Is the slot taken test: Check if among the RESERVATIONS entries of SC(FTS), any OPI is equal to the output port OPIS for which a scheduling is being attempted.

108. Take the slot task: Make an entry in SC(FTS) RESERVATIONS with its own SM-ID, with OPI equal to OPIS; create a SE with TTL=N, TSI=FTS, SM-ID equal to its own ID, and OPI=OPIS.

109. Carry over task: Test if carry over operation has been previously started. The flag CARRY=TRUE/FALSE is checked. If CARRY=TRUE, make an entry into the BLOCKAGE field of SC(FTS), with OPI=OPIS; otherwise, set CARRY=TRUE. Set FTS=FTS+N.

110. Sanity check: ETS should never be more than $2N^2$ positions away from CTS. If (ETS−CTS)>$2N^2$, abort with an error message.

The following benefits can be derived through CORPS:

No backlogged VOQ is starved, granted that it is eventually chosen by its SM. Assume a VOQ q is chosen by SM p. According to FIG. 14, the only way that SM p comes out of the reservation loop without successfully scheduling q is if it is blocked for the slot attempted. SM p being blocked means that queue q has been scheduled previously, and the remark follows. The only other way out of the loop is through the sanity check, but that would imply that the carry over operation did not find any available slot in the next N frames. Since there are at most N SMs involved in a collision, and multiple collisions are forbidden by the blocking procedure, the loop should never be exited this way.

It is assumed that M is the set of m input ports (SMs) continuously attempting to schedule the same output port q. Moreover, let $n_i^q(\Delta t)$ be the number of slots scheduled by SM i for output port q during $\Delta t$ time slots. A scheduler is m-fair if, for any interval of time $\Delta t$, and i, j∈M, $|n_i^q(\Delta t) - n_j^q(\Delta t)| \leq N$. In other words, a SM is never able to be N reservations ahead of any other SM.

Figure 14:
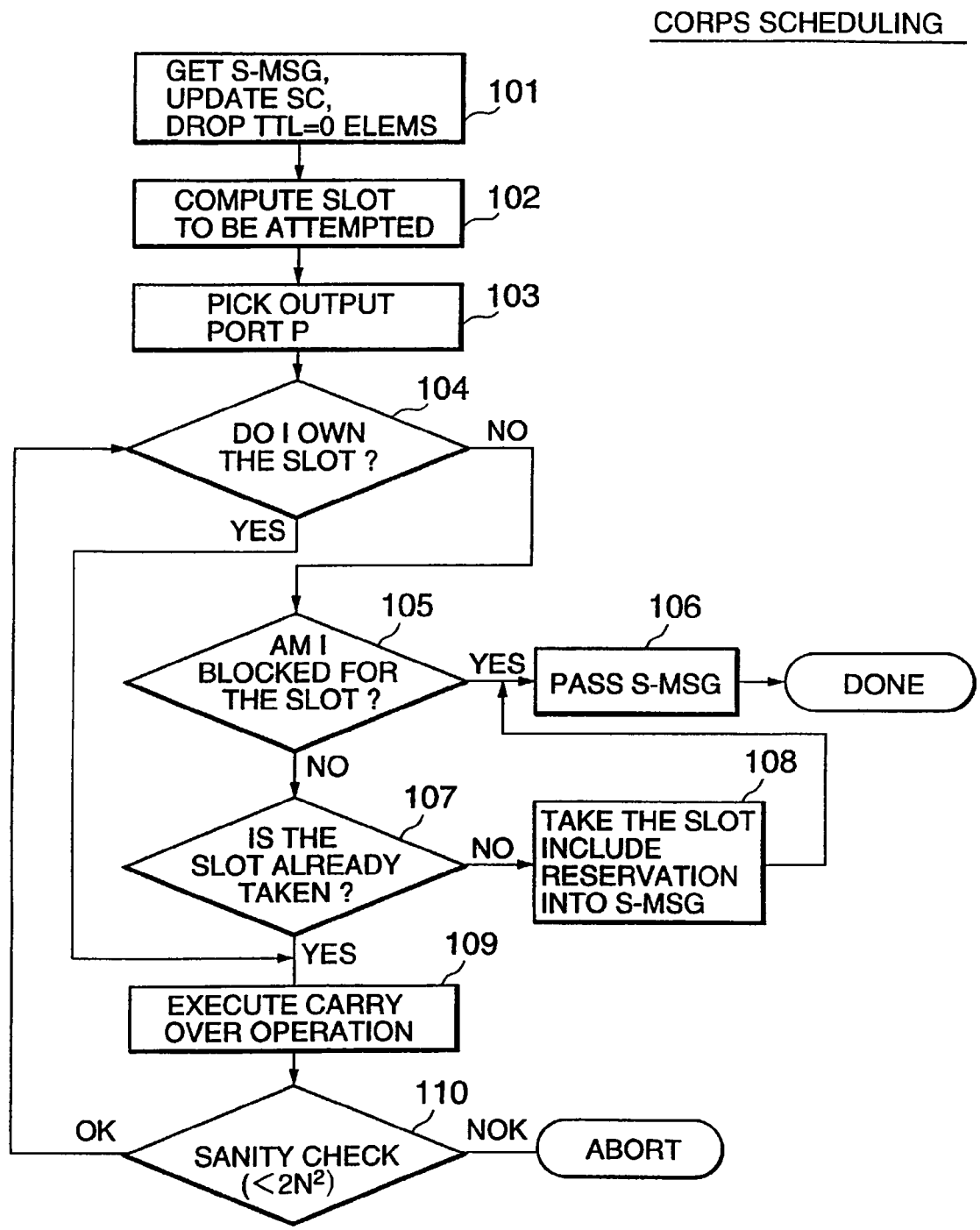
FIG. 14 illustrates a flow chart for the CORPS scheduling algorithm according to the second embodiment.
Figure 15:
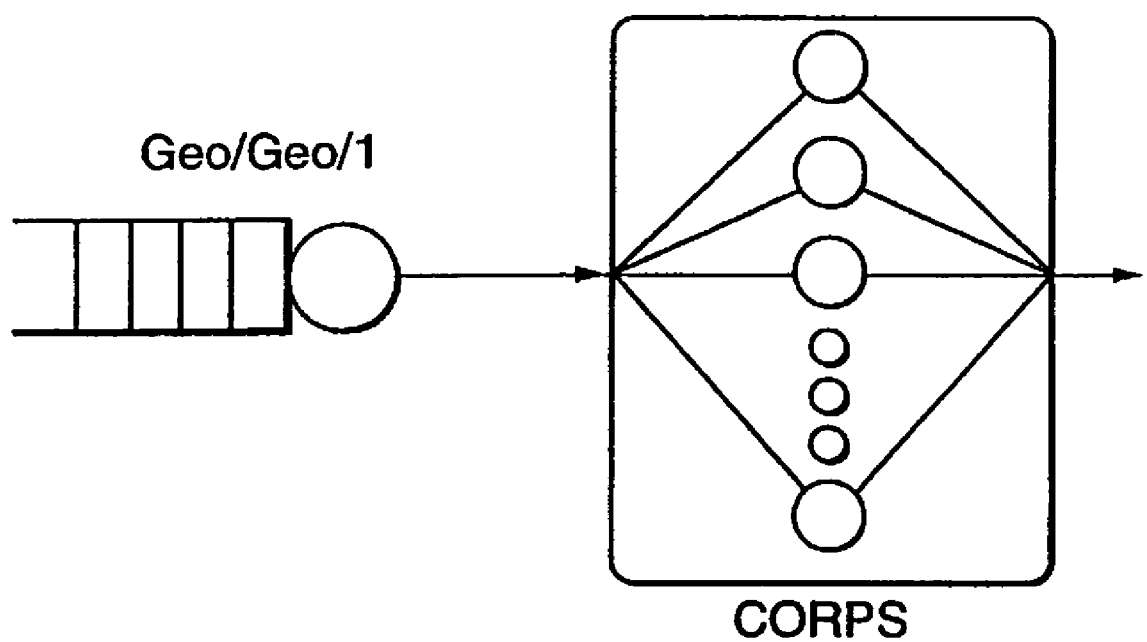
FIG. 15 illustrates the CORPS VOQ queuing model.

CORPS is m-fair, $1 < m \leq N$. Suppose m SMs are colliding over an output port q at a given slot ts. Each of the m SMs colliding is not blocked for that slot, for otherwise they would not even be able to test if the slot had already be taken (FIG. 14, box 105). If these m SMs are not blocked at slot ts, there must be m idle slots among the ts+nN, $1<n \leq i$ since the only way of accessing these slots into the future is through a carry over operation, and we know that these SMs have not performed any carry over operation over these slots, otherwise they would be blocked at ts. This means that, within the next i frames, each one of the colliding SMs will place a scheduling request for q. Now since they keep colliding for N consecutive slots of the current frame, and given that each collision generates one scheduling into the next i frames per SM, each SM will total N slots reserved in the next i frames for output port q. Thus, any subset of slots taken from the iN slots of the i frames over which the collision is being resolved can not contain any SM with more than N slots of advantage over any other SM.

The last remark is interesting because it means that a constantly backlogged VOQ can never get more than N packets served ahead of the corresponding VOQ of another SM, no matter how long the measurement interval is. In fact, in a long enough interval, all colliding SMs will get strictly the same number of reservations.

Additionally, under heavy load, queues with a common output port all have the same throughput, provided that they are all chosen by their SMs the same number of times (FIG. 14, box 108).

Few comments about CORPS architecture are due. The communication chain used to pass scheduling information among the SMs can be used for changing the scheduling pattern of slots in any way desired, as long as it is at least N slots into the future. For instance, output port reservations could be also withdrawn. This feature could be useful for a SM which has just placed a reservation far into the future, due to a collision, and at the very next slot it realizes that the port required is now free. If the SM places another reservation (an earlier one) for the same packet, the far away reservation may cause bandwidth wastage if not withdrawn. Reservation withdrawals, however, may adversely affect the properties described above. For instance, if a SM that has collided withdraws its reservation later on, it will adversely affect the delay of the packets scheduled after it in the same collision. In other words, a SM which has collided with i−1 other SMs and later erased its reservation due to this collision does not leave the system in the same state as if only i−1 SMs had collided in the first place. The present scheduler is as simple as possible, still satisfying the initial design goals. This ensures that the hardware required in an eventual implementation is kept simple.

CORPS resolves collisions by spreading the packet scheduling along multiple frames. Thus, it is reasonable to expect that the average packet delay be large, as compared with other schedulers. To that end, the performance of CORPS under uniform traffic is analyzed. The ultimate goal is to evaluate how the carry over operation affects packet delay, and the maximum utilization can be obtained from the system, compared to competitive scheduling algorithms.

An analytical model for CORPS is developed, in order to assess the scheduler performance, in terms of packet delay versus traffic load. Two major assumptions are made below: i) a uniform traffic arrival process; and ii) random VOQ queue selection by each SM (box 103 of FIG. 14), for sake of simplicity.

A target VOQ queue $Q_{mn}$, of a given SM m, destined to output port n is defined. Packets arrive at every input port according to a Bernoulli process, with intensity p. More specifically, in any given slot, a packet has probability p of arriving at an input port. Moreover, every packet has equal probability of being destined to any of the outgoing ports (assumption i). Thus, packet arrival process at our target VOQ queue n has a Bernoulli distribution with parameter p/N.

Regarding VOQ selection, each non-empty queue of a given SM has equal probability of being selected for scheduling (assumption ii). Therefore, for any VOQ, q is the probability of being selected, given that the VOQ in question is non-empty. Here we follow Chipalkatti et al. ("Protocols for Optical Star-Coupler Network using WDM" IEEE Journal on Selected Areas in Communications, Vol. 11, NO. 4, May 1993). If p is the utilization of all VOQs, the expected number of non-empty VOQ queues in a SM is given by 1+(N−1)ρ.

It is convenient to introduce another probability, closely related with q. Let r be the probability that any queue be picked by its scheduler. r differs from q in the sense that q assumes that the queue in question is non-empty, while r does not have this restriction. It is not difficult to see that:

$$r = \rho q = p/N \qquad (1)$$

The behavior of $Q_{mn}$ can be modeled in the following way. Packet interarrival time clearly follows a Geometric distribution, with parameter p/N. The head of line packet has to wait until it is selected by the SM, which happens with probability q in a given slot. Once it is selected, there is a probability of being blocked from scheduling, according to FIG. 14 (box 105). If $P_b^m$ is the probability of being blocked for a port m at a given slot, the waiting time of a head of line packet until it is picked by its SM follows a Geometric distribution, with parameter $s = q \times (1 - P_b)$. The superscript may be dropped since the probability is the same for all output ports. Once $Q_{mn}$ is selected, it is assumed that a reservation is always placed in a future time slot, and the packet departs from the queue into a type of conveyor belt; where it awaits its reserved time slot to come by, at which time it departs from the system.

The overall model used for $Q_{mn}$ queuing system is shown in FIG. 11. An arriving packet first joins a Geo(p/N)/Geo(s)/1 queue. Once it departs from the queue, it experiences an additional delay of $D_{corps}$, which is the delay resulting from the particular way CORPS resolves collisions. This is modeled by a box with an infinite number of servers.

The expected delay of a packet that goes through CORPS is given by the sum of the expected delay for a Geo(p/N)/Geo(s)/1 plus the average delay $\overline{D_{corps}}$. See, M. J. Karol, M. G. Hluchyj, S. P. Morgan, "Input Versus Output Queuing on a Space-Division Packet Switch", *IEEE Transactions on Communications*, Vol. COM-35, No. 12, pp. 1347–1356, December 1987. This may be written as:

$$D = \frac{p\overline{S(S-1)}}{2N\left(1 - \frac{p\overline{S}}{N}\right)} + \overline{S} + \overline{D_{corps}} \quad (2)$$

where S is the random variable with Geo(s) time distribution. The computation of $\overline{D_{corp}}$, will now be discussed.

Once $Q_{mn}$ is selected (the head of line packet departs from Geo(p/N)/Geo(s)/1), several events can take place. First, SM m must make sure that it does not own the slot being attempted (box 104, FIG. 14). Let $P_0{}^n$ be the probability that a slot is owned by a SM to output port n. Additionally, let $P_0{}^n$ be the probability that a given SM is blocked for output port n at a given time slot. From this it can be derived:

$$P_0^n = 1 + \frac{1}{N}\left[1 + (N+1)(1-r)^N - \frac{2[1-(1-r)^{N+1}]}{r}\right] \quad (3)$$

According to CORPS, a slot that is being visited by a SM can block the SM attempt to place a reservation only if this slot has been used to resolve a previous collision over the same output port.

Consequently, the probability that a SM owns any port is:

$$P_0 = 1 - (1 - P_0^n)^N \quad (5)$$

The expected delay $\overline{D_0}$ caused by box 104 of FIG. 14 is given by:

$$\overline{D_0} = \sum_{k=1}^{N} NkP_0^k(1-P_0) = N\left[\frac{P_0 - P_0^{N+2}}{1-P_0} - (N+1)P_0^{N+1}\right] \quad (6)$$

If the slot first visited by SM m is available (tests of boxes 104, 105, and 107 of FIG. 14 all fail), it is easy to see that the average delay $\overline{D_{corps}}$ of a packet is N, due to the priority matrix scheme used. If $\overline{D_{corps}}$>N, with no collision, at least one reservation would spill over to the second frame into the future. Now the delay $D_c$ incurred by collisions will be examined. If a collision with i−1 other SMs occurs over a particular slot, the delay $D_c$ can vary from N up to iN, depending which priority order SM m has on that slot. Thus, let $P[D_{corp},=jN|v=i]$ be the probability that the packet delay is jN given that SM m is the i-th SM to visit the slot. For instance, if m is the first SM to visit the slot, then:

$$P[D_{corps} = jN \mid v = 1] = \begin{pmatrix} 1 & \text{if } j = i \\ 0 & \text{otherwise} \end{pmatrix} \quad (7)$$

The previous expression simply states that, if SM m is the first to visit the slot, its packet will be delayed N slots, since CORPS schedules one frame into the future, if no collision occurs. Now recall that r is the probability that the VOQ queue for any output port of SM s(s≠m) is non-empty and is picked by s, in particular output port n. Then, it is not difficult to see that a general expression for $P[D_{corps}=jN|v=i]$ is:

$$P[D_{corps} = jN \mid v = i] = \begin{pmatrix} 0 & \text{if } j > i \\ \binom{i-1}{j-1}r^{j-1}(1-r)^{i-j} & \text{otherwise} \end{pmatrix} \quad (8)$$

The first clause of Equation 8 states that if m is the i-th SM to visit the slot, its delay can be at most iN. The binomial expression in the second clause states that, if i−1 SMs have visited the slot prior to m, any j−1 SMs among these could be the ones colliding with m. The joint distribution of events of the form ($D_{corps}$=jN and v=i) can be easily derived by multiplying the previous expression by 1/N, since SM m is equally likely to be the i-th visitor of a slot $1 \leq i \leq N$ (see FIG. 7).

The expected delay $D_c$ of a packet can then be derived as:

$$\overline{D_c} = \frac{N(N-1)}{2}r + N \quad (9)$$

The total delay incurred by CORPS scheduler is:

$$\overline{D_{corps}} = \overline{D_0} + \overline{D_c} \quad (10)$$

The last probability to be computed is $P_b$, the probability that a SM is blocked for a given output port n, at a given slot. It can be shown that:

$$P_b^n = \quad (11)$$
$$1 + \frac{1}{N}\left[1 + (N+1)(1-r)^N - \frac{2[1-(1-r)^{N+1}]}{r} + 2 + r - \frac{(1-r^{N+1})}{(1-r)}\right]$$

Now noticing that for Geo(s), $\overline{S}=1/s$ and $\overline{S(S-1)}=2(1-s)/s^2$, the total average delay a packet experience in the system is:

$$D = \frac{p(1-s)}{Ns^2\left(1 - \frac{p}{Ns}\right)} + \frac{1}{s} + \quad (12)$$
$$N\left[\frac{P_0 - P_0^{N+2}}{1-P_0} - (N+1)P_0^{N+1}\right] + \frac{N(N-1)}{2}r + N$$

where s=q×(1−$P_b$). The first three terms account for the delay in the VOQ queue, before the scheduling takes place. The third term accounts for the extra time the packet needs to wait due to the pipeline and collision resolution features of CORPS.

Figure 16:
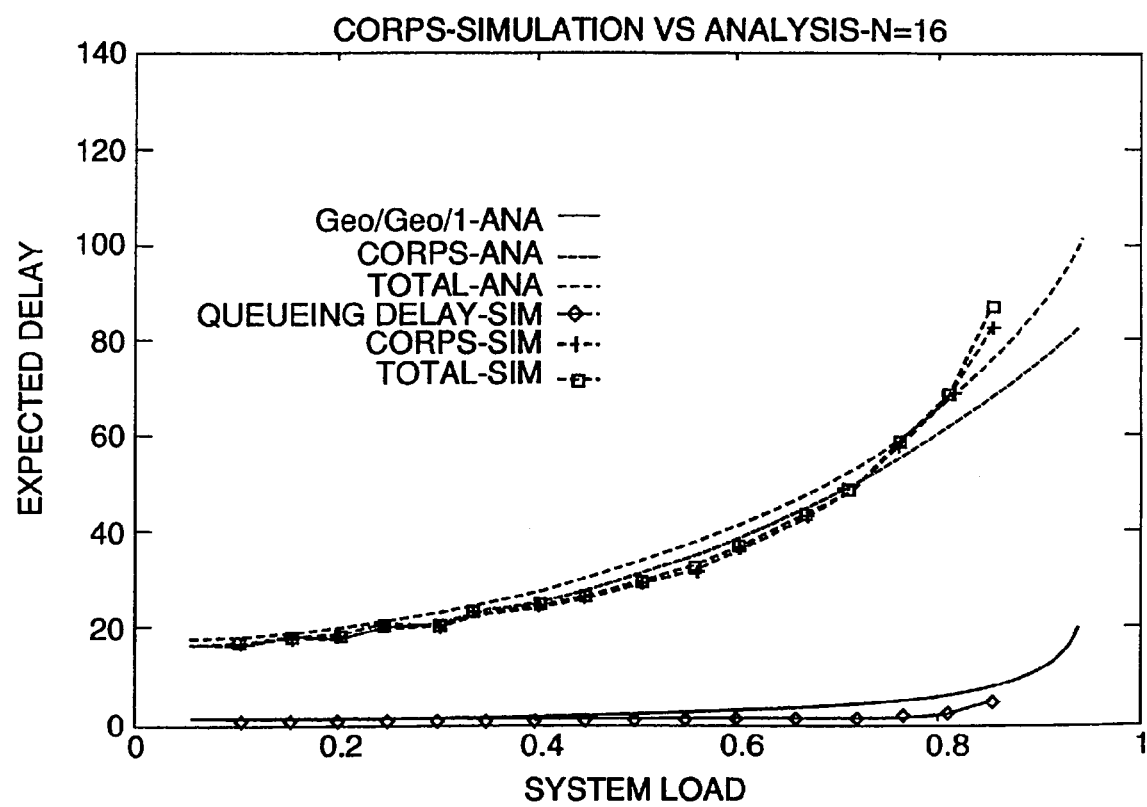
FIG. 16 is a graph presenting packet delays as a function of system load.

In FIG. 16, a comparison of CORPS delay versus throughput analytical results against a simulation of a 16×16 switch equipped with CORPS scheduler is shown. In the chart, there is a distinction between the average queuing delay a packet experiences until it gets picked by the SM scheduler, and the CORPS delay, due to the pipeline and collision resolution techniques used. As it can be seen, the analytical predictions match quite well the behavior of the simulated system.

The charts show that the scheduling delay dominates over queuing delay throughout the whole range of loads. Only for very high loads, when the queue starts building up, does the queuing delay become significant. This means that CORPS is doing a fine job in scheduling packets into the future as soon as they arrive at their VOQ queues. On the other hand, the mean delay incurred by CORPS grows from roughly one frame, under light loads, to about 5 frames, when the load reaches 0.85.

Figure 17:
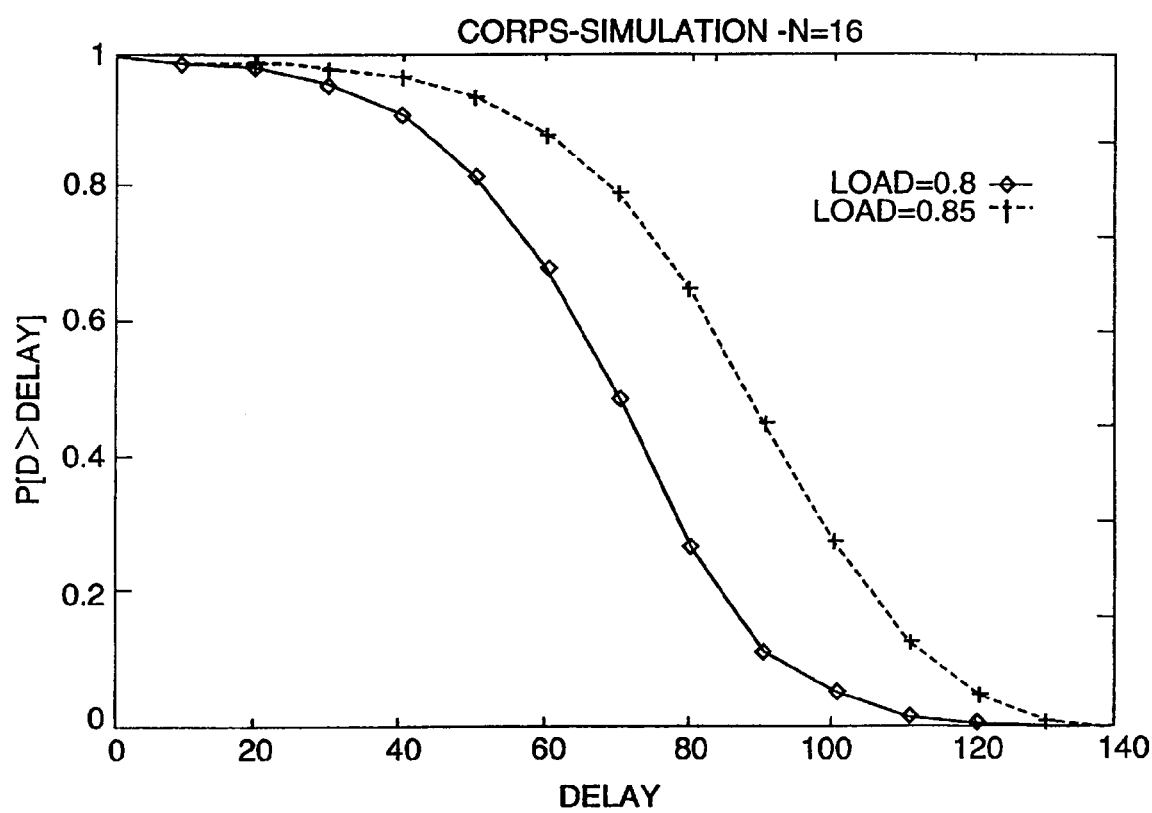
FIG. 17 illustrates the complementary delay distribution of a 16×16 switch equipped with a CORPS scheduler.

For completeness, FIG. 17 shows the complementary distribution of total delay in a 16×16 CORPS switch. The curves are for loads of 0.8 and 0.85, obtained by simulation. First it can be noticed that no packet takes more than $N^2$ slots to get through the system. This is due to the fact that CORPS does not allow multiple collisions to occur. In fact, the tail of the distribution seems to end somewhere near $N^2/2=128$. It is likely, though, that a packet delay of $N^2$ be approached, if the system is driven by extremely large loads.

Figure 18:
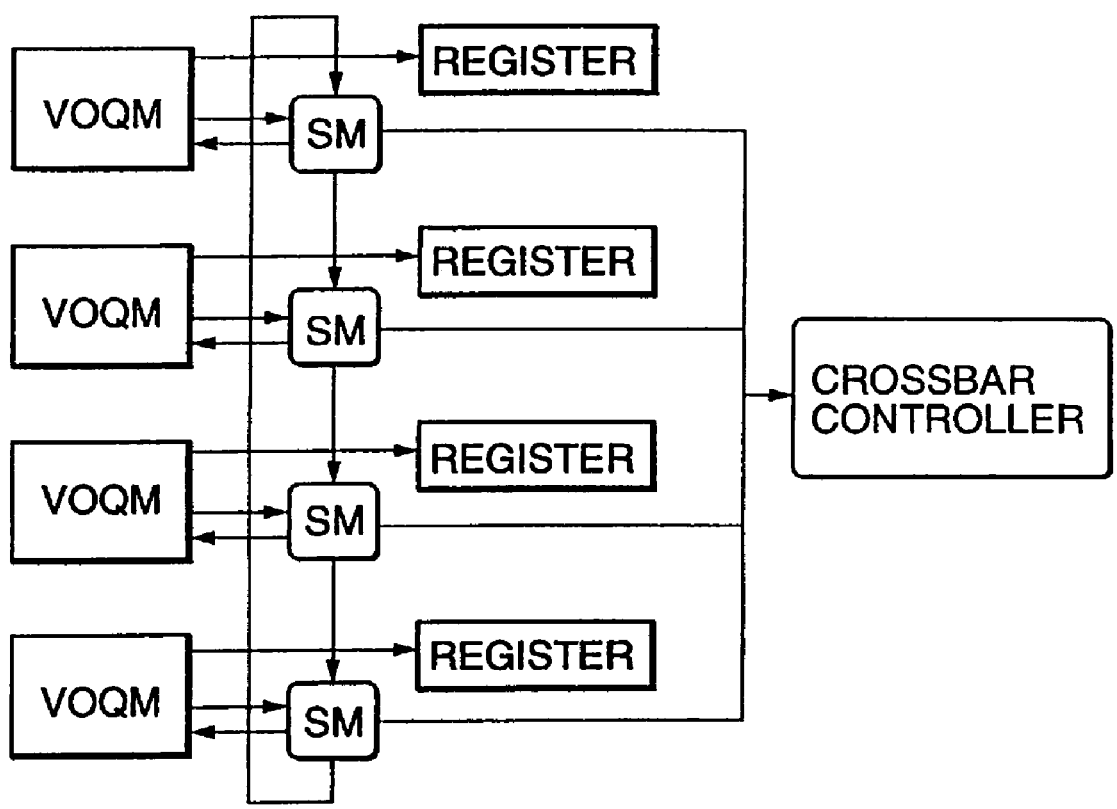
FIG. 18 illustrates a block diagram of a CORPS controller.

FIG. 18 illustrates, in block diagram, an implementation of CORPS. A VOQM module enqueues packets in virtual output queues. This module also makes request on behalf of a given queue to the SM module. The SM module controls the message passing and implements the CORPS scheduler. It communicates back with its VOQM to inform of a future slot reservation. This information is kept at the VOQM, so that at a given slot, a packet is transferred to the crossbar register to be switched.

In the figure, the communication between the SMs and the crossbar controller is shown to take place over a bus, although this particular type of communication is not necessary.

A fair comparison among scheduling algorithms should take into account not only performance measures, such as average delay and throughput, but also complexity and implementation costs. The first criterion for selection is high throughput. Moreover, only schedulers which operate with VOQ are compared. Thus, the following competitive schedulers are compared with the present invention: 1-SLIP and RRGS. The reason for selecting 1 iteration SLIP, as opposed to several iterations, is fairness in the comparison process. That is, it is assumed that at most one decision per slot can be made at any input port. i-SLIP, i>1 would effectively require more than one scheduling decision per slot.

For performance comparison, both analytical and simulation results have been relied upon. The delay performance of RRGS and SLIP, for uniform traffic, can be approximated by:

$$\overline{D_{RRGS}} = \frac{p(1-q)}{Nq^2\left(1-\frac{p}{Nq}\right)} + \frac{1}{q} + \frac{N}{2} \quad (13)$$

$$\overline{D_{SLIP}} = \frac{pN}{2(1-p)} \quad (14)$$

Figure 19:
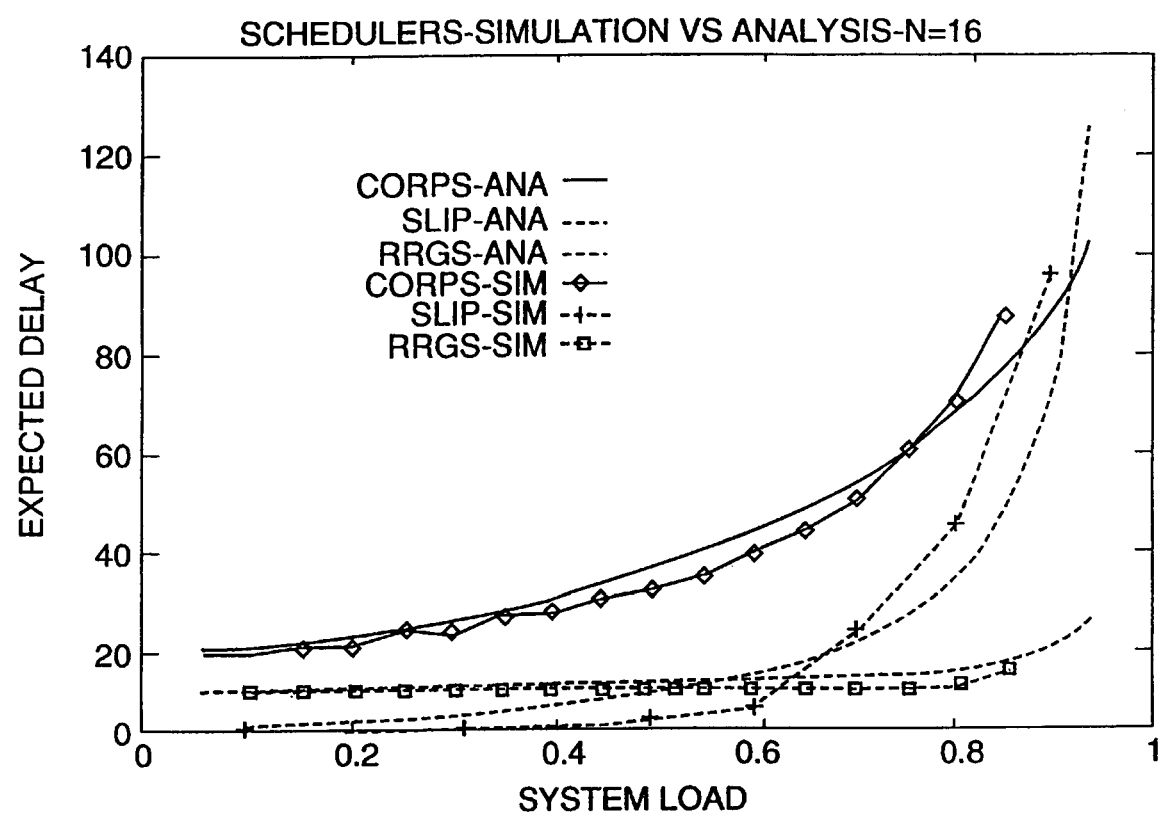
FIG. 19 is a graph showing expected delay versus system load for various competitive schedulers.

For RRGS results, see A. Smiljanic, R. Fan, G. Ramamurthy, "RRGS-Round-Robin Greedy Scheduling for Electronic/Optical Terabit Switches", *NEC C & C Research Laboratories*, Technical Report TR 98-C063-4-5083-2, 1998 and for SLIP results, see N. McKeown, "Scheduling Cells in an Input-Queued Switch", *PhD Thesis*, University of California at Berkeley, 1995. FIG. 19 depicts the average delay versus throughput performance of these algorithms, against CORPS.

From the figure, it is evident that RRGS and CORPS are able to sustain much higher loads than SLIP, before delays become significant. One can easily see that the derivative of these curves, for high load, is significantly smaller for RRGS and CORPS. However, both algorithms carry an offset delay budget for medium to light loads. For RRGS, this is exclusively due to the pipeline technique used. For CORPS, the additional delay is due to collision resolution, as addressed in the previous section. However, CORPS has two advantages over RRGS: i) It allows freedom of choice about which output port a SM should pick; ii) It is a strictly fair scheduler. SLIP is also a fair scheduler although its collision resolution process is entirely different than the CORPS one.

As mentioned before, CORPS gives complete freedom of choice as to which output port a schedule should be attempted. Namely, each VOQM is free to choose any output port to be scheduled on behalf of a given VOQ. This fact was an important part of the scheduler design strategy. Therefore, many algorithms can be used for VOQ selection, in conjunction with CORPS. So far, one such algorithm, namely, random selection among non-empty VOQs has been discussed. Other examples of VOQ selection strategies are possible. The VOQ selection strategies may be classified into two classes: cooperative and non-cooperative selection strategies.

Non-cooperative VOQ selection strategies are those for which a VOQ selection decision is made per input port (VOQM), independently from other input ports. The random selection strategy used in the analysis of CORPS belongs to this class.

Weighted Fair Queuing (WFQ) is a popular service strategy in the packet switching research literature. See, for example, H. Zhang, "Service Disciplines for Guaranteed Performance Service in Packet-Switching Networks", *In Proceedings of IEEE*, Vol. 83, no. 10, pp. 1374–1396, October 1995. The idea is to regulate service rates of various queues competing for an output link capacity, according to predefined weights. In a VOQ CORPS switch, an output port bandwidth can be split among various VOQMs, by some sort of a Call Admission Controller. WFQ then can be used to enforce that the maximum service rate of a VOQ queue does not exceeds the VOQM bandwidth share of a given output port.

Rate-Controlled Service (RCS) discipline assumes that a given traffic flow satisfy certain burstiness constraints at the network entry point. See, L. Georgiadis, R. Guerin, V. Pens, "Efficient Network QoS Provisioning Based on per Node Traffic Shaping," *Proceedings of INFOCOM96*, vol. 1, pp. 102–110, 1996. These constraints are typically enforced by a traffic shaper at the edge of the network. Moreover, traffic shapers are also placed at intermediate switches, so that the traffic can be brought back to comply with such constraints at each and every intermediate switching point in the network. A traffic shaper is typically implemented by a leaky bucket algorithm. J. Turner, "New Directions in Communications, or Which Way to the Information Age?", *IEEE Communication Magazine*, Vol. 24, pp. 8–15, 1986 describes one such algorithm. A basic leaky bucket is a queue with system with two queues, one for data, and one for tokens, or permits. A data packet on the queue needs a permit to be eligible for service. Only a limited number of permits are stored at the permit queue. Permits are generated at a constant rate. A traffic shaper of this kind could be used to regulate which among the VOQs are eligible for service. Among the eligible ones, any algorithm could be used for queue selection.

The two service disciplines described above may be used for the support of Quality of Service (QOS) in packet networks, in itself an active research area. Such a QOS supportive strategy is likely to be of a non-cooperative type, as it is supposed to ensure a predicted service behavior of its VOQs, regardless of other cross traffic streams. Algorithms belonging to this class are likely could used in switches supporting stringent QoS applications, such as video and voice streams.

Cooperative VOQ selection strategies are those for which a VOQ selection depends on the state of the entire set of VOQs in the switch. These strategies typically aim at providing a good overall switch behavior, such as maximizing throughput, rather than concentrating on the service of each flow. Thus, the use of these strategies in switches occurs in supporting data traffic, with no commitment to any QoS requirements.

For cooperative strategies, additional information needs to be provided to the CORPS scheduler, such as the state of other VOQs. The information about the state of the queues is always "stale", so the service strategy must be robust with regard to stale information.

A maximum matching problem consists in finding, among edges of a given graph, a subset of edges which "pairs" together the vertices of the graph, in a way to maximize the total number of pairs. See, Cormen, Leiserson and Rivest, "Introduction to Algorithms", McGraw-Hill, 1990. However, no vertex can have more than one selected edge attached to it. If the number of packets switched at every slot is maximized, a Maximum Bipartite Matching (MBM) problem needs to be solved. See, R. E. Tarjan, "Data Structures and Network Algorithms", *Society for Industrial and Applied Mathematics*, Pennsylvania, November 1983. Algorithms for solving the MBM are available, with reasonable computation complexity. See, J. E. Hopcroft, R. M. Karp, "An $n^{5/2}$ Algorithm for Maximum Matching in Bipartite Graphs", *Society for Industrial and Applied Mathematics J. Comput.*, 2 (1973), pp. 225–231. In the present invention, VOQs empty/non-empty state information can be sent through the communication chain, and passed to the VOQMs, where a MBM algorithm would decide which queue to serve in a slot of the next frame. Interestingly enough, CORPS allows queues not selected by the MBM algorithm to also attempt a reservation into the future.

A Maximum Weight Bipartite Matching (MWBM) problem is similar to the MBM problem just described. The major difference is that, in the former, weights are associated with the edges of a graph, and the objective is to find a set of edges which maximizes the sum of the edge weights of the matching. Others have used MWBM algorithms to show that, under nonuniform traffic, they outperform MBM strategies in terms of throughput. See, N. McKeown, V. Anantharam, J. Walrand, "Achieving 100% Throughput in an Input-Queued Switch", *Proceedings of Infocom96*, San Francisco, March 1996. The idea is to use VOQ queue sizes as weights, in order to handle non-uniform traffic scenarios.

The above reference also shows that MWBM algorithms are stable, i.e., VOQ queues never blow up, as long as the input traffic is admissible. A traffic is admissible if the sum of the input traffic rates towards a single output port does not exceed its capacity, for every output port. An interesting result of this is that the stability of the MWBM is maintained, even in the presence of stale information, that is, the weights are based on queue levels of some number of time slots in the past. Thus, again VOQs' queue level information can be passed to all VOQM, so that a MWBM algorithm is run at each module, before a request for an output port is issued to the SMs.

Additional advantages and modifications will readily occur to those skilled in the art. Therefore, the invention in its broader aspects is not limited to the specific details shown and described herein. Accordingly, various modifications may be made without departing from the spirit or scope of the general inventive concept as defined by the appended claims and their equivalents.

What is claimed is:

1. A switch for controlling a flow of data in a network, comprising:
    a plurality of input ports;
    output ports; and
    a pipelined distributed scheduler having a plurality of input port schedule modules, to schedule a particular input port of said input ports for sending data to a designated output port of said output ports;
    wherein the plurality of input port schedule modules are connected in a ring,
    wherein each of the plurality of input ports are connected to a separate input port schedule module from the plurality of input port schedule modules;
    wherein a current schedule module receives a scheduling message from a previous schedule module, computes a future time slot for which said current schedule module will attempt to access said designated output port, determines if said future time slot is valid based on whether said future time slot is currently reserved by said current schedule module, whether said future time slot is blocked and whether said future time slot is taken by another schedule module and takes said future time slot if valid and enters information into said scheduling message indicating that said future time slot is taken;
    wherein said scheduler selects said designated output port based on a weighted round robin scheme.

2. A switch as claimed in claim 1, wherein said scheduler computes a new future time slot by advancing the future time slot by a number of time slots when said future time slot has been reserved or taken.

3. A switch as claimed in claim 1, wherein said data input through said input ports is queued using virtual output queuing that maintains separate queues for each of said output ports.

4. A switch as claimed in claim 3, wherein said virtual output queuing for a particular port is independent of said virtual output queuing for the other ports.

5. A switch as claimed in claim 3, wherein service rates of said virtual output queuing are both predictable and adjustable.

6. A method of scheduling input signals arriving at input ports of a switch to be sent to output ports of said switch having a pipelined distributed scheduler and having a plurality of interconnected input port schedule modules where each of the input port is connected to a separate input port schedule module, the method comprising the steps of:
    a) receiving a scheduling message from a previous schedule module by a current schedule module;
    b) computing a future time slot for which said current schedule module will attempt to access one of said output ports;
    c) selecting one of said output ports to schedule for transmission at said future time slot;
    d) determining whether said future time slot has been previously reserved by said current scheduling module;
    e) determining whether said future time slot is blocked, when said future time slot not has been previously reserved;
    f) determining whether said future time slot was previously taken by another schedule module, when said future time slot is not blocked g) determining whether a carry over operation was previously started from said scheduling message, when said future time slot is taken by another schedule module or has been previously reserved by said current scheduling module;

h) setting said future time slot to be blocked and returning to step d), when said carry over operation was previously started;

i) advancing said future time slot by a predetermined number of time slots, setting a carry over flag and returning to step d), when said carry over operation was not previously started;

j) taking said future time slot and entering information into said scheduling message indicating that said future time slot is taken, when said future time slot has not previously taken by another schedule module; and k) passing said scheduling message to a next schedule module wherein said scheduler selects said designated output port based on a weighted round robin scheme.

7. A method of scheduling as claimed in claim 6, wherein said data input through said input ports is queued using virtual output queuing that maintains separate queues for each of said output ports.

8. A method of scheduling as claimed in claim 7, wherein said virtual output queuing for a particular port is independent of said virtual output queuing for the other ports.

9. A method of scheduling as claimed in claim 7, wherein service rates of said virtual output queuing are both predictable and adjustable.

10. A switch for controlling a flow of data in a network, comprising:

a plurality of input ports;

output ports; and a pipelined distributed scheduler having a plurality of input port schedule modules, to schedule a particular input port of said input ports for sending data to a designated output port of said output ports;

wherein the plurality of input port schedule modules are connected in a ring, wherein each of the plurality of input ports are connected to a separate input port schedule module from the plurality of input port schedule modules;

wherein the schedule modules are connected in a ring and, at each time slot, each of the schedule module receives reservation information from a previous schedule module, determines whether the future time slot is permitted to be reserved for said schedule module to send data, and sends reservation information including its own reservation for the future time slot to a next scheduler module;

wherein said scheduler selects said designated output port based on a weighted round robin scheme.

11. A method for scheduling input signals arriving at input ports of a switch to be sent to output ports of said switch having N interconnected input port schedule modules where each of the input port is connected to a separate input port schedule module, the method comprising the steps of:

a) setting a sequence of frames, each of the frames consisting of N time slots; and b) scheduling the input signals in a current frame so that the input signals are sent to the output ports in a next frame following the current frame;

wherein the step b) comprises the steps of:

b.1) receiving a scheduling message from a previous schedule module by a schedule module;

b.2) computing a future time slot for which said current schedule module will attempt to access one of said output ports, wherein said future time slot is included in the next frame;

b.3) selecting one of said output ports to schedule for transmission at said another scheduling module;

b.4) determining whether said future time slot has been previously reserved by another scheduling module;

b.5) taking said future time slot and entering information into said scheduling message indicating that said future time slot is taken, when said future time slot has not Previously been taken by another schedule module; and b.6) passing said scheduling message to a next schedule module;

wherein said scheduler selects said designated output port based on a weighted round robin scheme.

12. A method according to claim 11, wherein the step b) comprises the steps of:

simultaneously starting scheduling decision processes of the N input port schedule modules at the beginning of each frame;

simultaneously performing the scheduling decision processes using a pipelined approach in said frame; and simultaneously completing the scheduling decision processes at the end of said frame.

13. A method according to claim 11, wherein in the step b), scheduling decision processes of the N input port schedule modules are simultaneously performed in said current frame, wherein the N input port schedule modules make scheduling decisions for different time slots of said next frame.

14. A method according to claim 11, wherein in the step b), the input signals in said current frame are scheduled to be sent to the output ports in said next frame by referring to an N×N matrix which defines an ordered sequence of the N input port schedule modules to visit a given time slot in the future.

* * * * *